(12) United States Patent
Cao et al.

(10) Patent No.: US 10,185,423 B2
(45) Date of Patent: Jan. 22, 2019

(54) PLUG-IN TOUCH DISPLAY DEVICE AND AN ELECTRONIC DEVICE

(71) Applicant: Wuhan China Star Optoelectronics Technology Co., Ltd., Wuhan, Hubei (CN)

(72) Inventors: Chang Cao, Guangdong (CN); Yu-cheng Tsai, Guangdong (CN); Changwen Ma, Guangdong (CN); Zhou Zhang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 207 days.

(21) Appl. No.: 15/117,521

(22) PCT Filed: May 26, 2016

(86) PCT No.: PCT/CN2016/083499
§ 371 (c)(1),
(2) Date: Aug. 9, 2016

(87) PCT Pub. No.: WO2017/190388
PCT Pub. Date: Nov. 9, 2017

(65) Prior Publication Data
US 2018/0113542 A1    Apr. 26, 2018

(30) Foreign Application Priority Data
May 4, 2016    (CN) .......................... 2016 1 0288586

(51) Int. Cl.
*G02F 1/1343*    (2006.01)
*G02F 1/1333*    (2006.01)
(Continued)

(52) U.S. Cl.
CPC ........ *G06F 3/0412* (2013.01); *G02F 1/13338* (2013.01); *G02F 1/133308* (2013.01);
(Continued)

(58) Field of Classification Search
CPC ......... G06F 3/0412; G06F 3/044; G06F 3/041
See application file for complete search history.

(56) References Cited

U.S. PATENT DOCUMENTS

2010/0053103 A1    3/2010  No
2016/0282999 A1*   9/2016  Hwang .................. G06F 3/044
(Continued)

FOREIGN PATENT DOCUMENTS

CN    103529993 A    1/2014
CN    105068695 A    11/2015
(Continued)

*Primary Examiner* — Kevin M Nguyen
(74) *Attorney, Agent, or Firm* — Andrew C. Cheng

(57) ABSTRACT

A plug-in touch display device includes a capacitive touch screen stacked on a display module. The display module includes a display panel and a backlight module that are supported in a middle frame. The display panel includes an array substrate that includes a pixel electrode, which also serves as a first capacitive sensing electrode. The middle frame has one side facing the backlight module and receiving a second capacitive sensing electrode arranged therein. A gap exists between the second capacitive sensing electrode and backlight module. The first capacitive sensing electrode and the second capacitive sensing electrode configure an electrode-induction device jointly, for sensing a pressure signal applied on the capacitive touch screen. In a display time period of one frame, the pixel electrode transmits pixel voltage signals and pressure sensing signals alternately.

14 Claims, 1 Drawing Sheet

(51) Int. Cl.
*G06F 3/044* (2006.01)
*G06F 3/041* (2006.01)

(52) U.S. Cl.
CPC ........ *G02F 1/134309* (2013.01); *G06F 3/044* (2013.01); *G02F 1/13439* (2013.01); *G02F 2001/133302* (2013.01); *G02F 2001/133317* (2013.01); *G02F 2201/121* (2013.01); *G02F 2201/123* (2013.01); *G06F 2203/04105* (2013.01)

(56) References Cited

U.S. PATENT DOCUMENTS

2017/0024038 A1* 1/2017 Noguchi ................. G06F 3/044
2017/0090637 A1* 3/2017 Yoon .................... G06F 3/0414

FOREIGN PATENT DOCUMENTS

| | | | | |
|---|---|---|---|---|
| CN | 105117065 A | 12/2015 | | |
| CN | 205015863 U | 2/2016 | | |
| JP | 2016-044631 | * 7/2015 | ............. | G06F 3/041 |

* cited by examiner

PLUG-IN TOUCH DISPLAY DEVICE AND AN ELECTRONIC DEVICE

FIELD OF THE INVENTION

The present invention relates to a technology of liquid crystal display, and more particularly, to a plug-in touch display device with a pressure sensing touch-enabled function, and more particularly to an electronic device comprising the plug-in touch display device.

DESCRIPTION OF PRIOR ART

By developing and progressing device technology of mobile electronic products, the use of touch screen become more and more important. There are many different touch sensor technologies especially for capacitive touch screens. Working principle of capacitive touch screens is to recognize the position information on a plane touched by a finger. (It can accurately calculate the position of touch point by obtaining the change of capacitances which in the X-axis direction electrodes and the Y-axis direction electrodes.) With the increased requirements of touch-screen technology, to an ideal touch-screen display, not only will it precisely sense the positional signals, but will also accurately detect the vertical pressure (along Z-axis.) So it can achieve the traditional human interaction transforms from two-dimensional to three-dimensional.

But currently, screens with a pressure sensing touch-enabled function device are mostly achieved to by configuring a plurality of additional pressure sensors in display (i.e. liquid crystal display.) This design needs to make major changes in its structural design, and the structural is more complicated, processes are more difficult too. The pressure sensors have limited spatial resolution, when the number of the pressure sensors increases, it will affect display quality of the display negatively.

SUMMARY OF THE INVENTION

In view of this, the present invention provides a plug-in touch display device with a pressure sensing touch-enabled. It uses a simplified structure of display to achieve pressure sensing touch-enabled function in a display device and reduce costs.

In order to achieve the objects set forth, the present invention utilizes the following technical measurements to resolve encountered by prior arts.

A plug-in touch display device comprises a capacitive touch screen and a display module which are stacked together. The capacitive touch screen is used for sensing touch signal. The display module comprises a display panel and a backlight module arranged relatively and a middle frame used for supporting the display panel and the backlight module. The display panel comprises an array substrate. The array substrate comprises a plurality of pixel electrode layer arranged, wherein the pixel electrode layer is used for a first capacitive sensing electrode. The middle frame is toward one side of the backlight module, and further arranging the second capacitive sensing electrode. There is a gap between in the second capacitive sensing electrode and backlight module. The first capacitive sensing electrode and the second capacitive sensing electrode configure an electrode-induction device jointly, which are used for sensing the pressure signal applied on the capacitive touch screen. Wherein, in the display time in one frame, the pixel electrode layer is used for transmitting voltage signals of pixel and pressure sensing signals alternatively.

Wherein material of the second capacitive sensing electrode is ITO (indium tin oxide).

Wherein the capacitive touch screen comprises a touch sensing electrode driving and a touch induction electrode arranged on different layers. The touch sensing driving electrode and the touch induction electrode are used for inducting touch signals applied on the capacitive touch screen.

Wherein the capacitive touch screen is connected a touch driver chip and the electrode-induction device is connected a pressure sensor driver chip.

Wherein the touch driver chip and the pressure sensor driver chip are integrated in the same control chip.

Wherein the display panel further comprises a filter substrate. The filter substrate and the array substrate are arranged corresponding to each other. A liquid crystal layer is arranged between in the array substrate and the filter substrate.

Wherein the array substrate comprises a first glass substrate. A pixel electrode layer and a common electrode layer are arranged sequentially on the side of the liquid crystal layer near the first glass substrate. The pixel electrode layer and the common electrode are layer insulated from each other.

The present invention further provides an electronic device which comprises a housing and a touch display device installed in the housing, wherein the touch display device is the plug-in touch display device as described above.

Comparing to the prior art, the plug-in touch display device provided by embodiment of the present invention which is according to an existing two-dimensional touch-enabled plug-in touch display device, by arranging the second capacitive sensing electrode between in the middle frame and the backlight module and using the pixel electrode layer is used for a first capacitive sensing electrode in the display panel, then the first capacitive sensing electrode and the second capacitive sensing electrode configure an electrode-induction device jointly which are used for sensing the pressure signal applied on the capacitive touch screen, so as to realize three-dimensional touch function. Its structure is simple and easy to produce and it is low cost of production. Further, material of the additional second capacitive sensing electrode is ITO which is transparent, and it is arranged on the back of the backlight module. It can realize the three-dimensional touch function without affecting the quality of liquid crystal display device.

DESCRIPTION OF PREFERRED EMBODIMENT

Technical implementation will be described below clearly and fully by combining with drawings made in accordance with an embodiment in the present invention. Obviously, the described embodiments are merely part of embodiment of the present invention, not at all. Based on the embodiments of the present invention, on the premise of embodiments in the absence of creative work, all other embodiments are in the scope of protection in the present invention.

Here, it should be noticed that in order to prevent the essence of the present invention from out of focus resulted from over-emphasizing unnecessary details, the attached drawing figures disclose only related configurations or operating processes, while other details unrelated to the subject matter of the present invention has been omitted.

Figure 1:
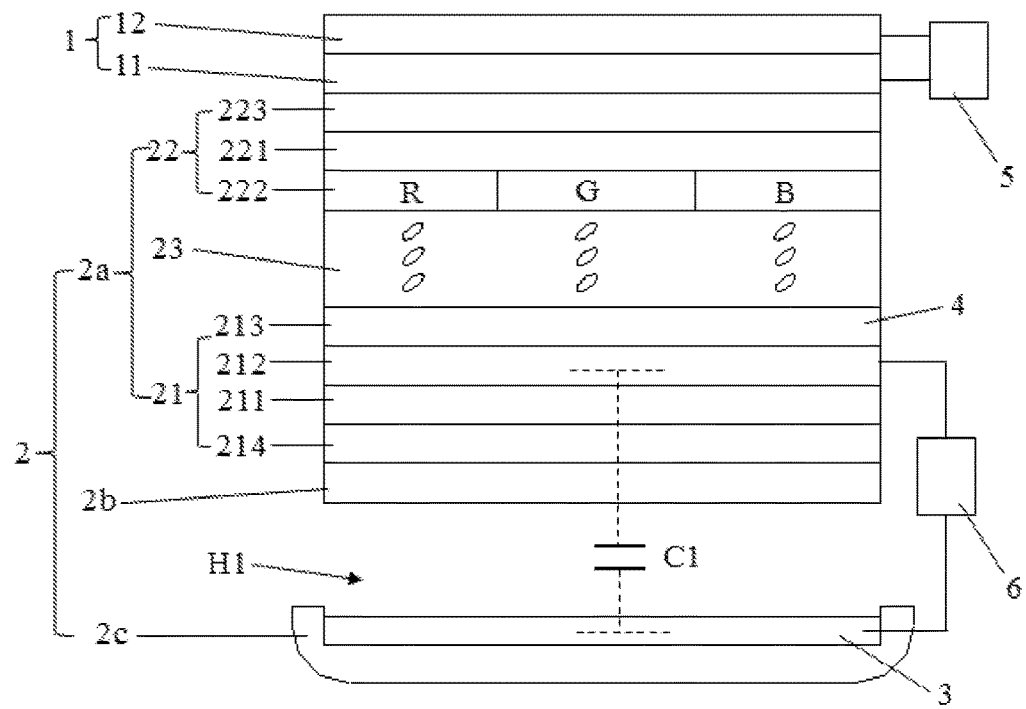
FIG. 1 is a structural illustration of an embodiment made in accordance to a plug-in touch display device in the present invention.

According to a plug-in touch display device provided by an embodiment of the present invention, referring to FIG. 1, the plug-in touch display device comprises a capacitive touch screen 1 and a display module 2 which are stacked together.

Wherein the capacitive touch screen 1 comprises a touch sensing electrode driving 11 and a touch induction electrode 12 arranged on different layers. The touch sensing driving electrode 11 and the touch induction electrode 12 is used for inducting touch signals applied on the capacitive touch screen 1.

Wherein the display module 2 comprises a display panel 2a and a backlight module 2b arranged relatively and a middle frame 2c used for supporting the display panel 2a and the backlight module 2b. The backlight module 2b provides a light source to the display panel 2a, and the display panel 2a displays images.

Wherein the display panel 2a comprises an array substrate 21 and a filter substrate 22 which are arranged corresponding to each other, and the display panel 2a comprises a liquid crystal layer 23 is arranged between in the array substrate 21 and the filter substrate 22. Specifically, referring to FIG. 1, the array substrate comprises a first glass substrate 211, and a pixel electrode layer 212 and a common electrode layer 213 are arranged sequentially on the side of the liquid crystal layer 23 near the first glass substrate 211. A first polarizer 214 is arranged on the side of the backlight module 2b near the first glass substrate 211. The pixel electrode layer 212 and the common electrode layer 213 are insulated conductive structure layer from each other (insulation structure is not shown in the figure.) The filter substrate 22 comprises a second glass substrate 221 and a color resist layer 222. The color resist layer 222 is arranged on the side of the liquid crystal layer 23 near the second glass substrate 221, wherein the color resist layer 222 comprises a red resist R, a green resist G and a blue resist B. A second polarizer 223 is arranged on the side of the capacitive touch screen 1 near the second glass substrate 221. Data lines, scan lines, thin film transistor arrays and so on are also to be arranged in the array substrate 21. A black matrix is also to be arranged in the filter substrate 22. This structures are not closely relative to the improvement of the present invention. Therefore, it will not be shown in the drawings and its details are not described here.

Wherein referring to FIG. 1, the middle frame 2c is toward one side of the backlight module 2b, and further arranging the second capacitive sensing electrode 3. There is a gap H1 between in the second capacitive sensing electrode 3 and backlight module 2b. The gap can ensure a sufficient deformation space when touch display device is touched. Wherein material of the second capacitive sensing electrode 3 is ITO. Further, the pixel electrode layer 212 is used for a first capacitive sensing electrode 4 in the present embodiment. The first capacitive sensing electrode 4 and the second capacitive sensing electrode 3 configure an electrode-induction device C1 jointly, which is used for sensing the pressure signal applied on the capacitive touch screen 1. Therefore, in the display time in one frame, the pixel electrode layer 212 is used for transmitting voltage signals of pixel and pressure sensing signals alternatively.

Specifically, the capacitive touch screen 1 is connected a touch driver chip 5 and the display panel 2a is connected a panel driver chip (not shown in the figure.) The electrode-induction device C1 is connected a pressure sensor driver chip 6. Wherein the touch driver chip 5, the panel driver chip and the pressure sensor driver chip 6 can be integrated in the same control chip and connect corresponding components by a FPC (flexible printed circuit,) respectively. The touch driver chip 5 drives touch sensing driving electrode 11 of the capacitive touch screen 1 and the touch induction electrode 12 to sense the position of touch. Furthermore, processes in the display time in one frame, when in a process of display the pixel electrode layer 212 (the first capacitive sensing electrode 4) transfers voltage signals of pixel, then the display panel displays images. And when in a process of touch, the pixel electrode layer 212 (the first capacitive sensing electrode 4) transfers pressure sensing signals. When a finger touches the capacitive touch screen 1, the distance between in the first capacitive sensing electrode 4 and the second capacitive sensing electrode 3 becomes shorter. Then capacitance of the electrode-induction device C1 which the first capacitive sensing electrode 4 and the second capacitive sensing electrode 3 configure jointly changes, correspondingly. By establishing relationship of changing value of a capacitance and pressure value, when the pressure sensor driver chip 6 obtains the changing value of a capacitance, pressure information of touching can be obtained. Pressure sensing touch-enabled function can be achieved, so as to realize three-dimensional touch function in touch display device.

Figure 2:
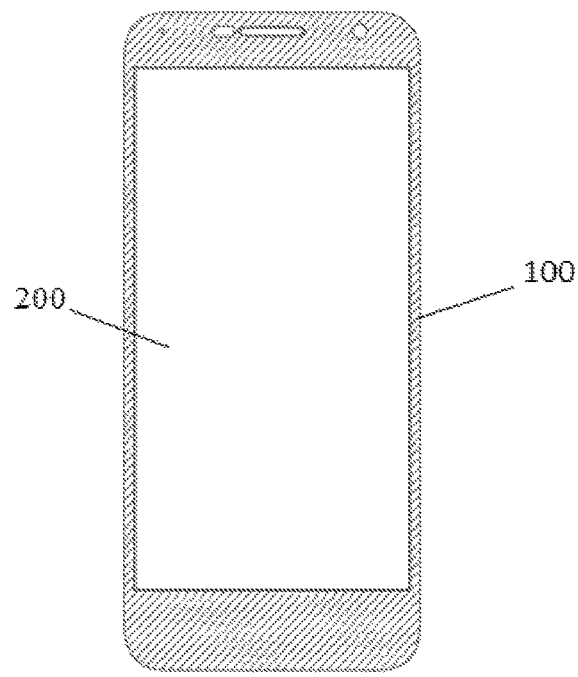
FIG. 2 is a structural illustration of an embodiment made in accordance to an electronic device substrate in the present invention.

The present invention further provides an electronic device, referring to FIG. 2, which comprises a housing 100 and a touch display device 200 installed in the housing 100, wherein the touch display device 200 is the plug-in touch display device as described above. Wherein the electronic device can be a smartphone, a tablet PC, a smart watch, a smart speaker and so on.

In summary, the plug-in touch display device provided by embodiment of the present invention which is according to an existing two-dimensional touch-enabled plug-in touch display device, by arranging the second capacitive sensing electrode between in the middle frame and the backlight module, then the first capacitive sensing electrode and the second capacitive sensing electrode configure an electrode-induction device jointly which are used for sensing the pressure signal applied on the capacitive touch screen, so as to realize three-dimensional touch function. Its structure is simple and easy to produce and it is low cost of production. Further, the additional second capacitive sensing electrode is arranged on the back of the backlight module. It can realize the three-dimensional touch function without affecting the quality of liquid crystal display device.

It should be noticed that in this specification, terms used to describe relationship between parts or elements, such as first and second, are merely used to distinguish one element from another. It does not necessary require or imply that any actual relationship or sequence, existed between. Moreover, the terms of "comprising", "including" or any other various words are used as open-ended description. As such, with the utilization of "comprising", "including" or any other various words, it is so construed that not only will the processes, method, article or apparatus include those listed elements, but also will it includes other elements not listed or further includes conventional elements inherited in those processes, method, article or apparatus. Without additional and further limitation, the term of "including one" is not merely limited to one, but also includes additional one, if possible.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A plug-in touch display device comprising a capacitive touch screen and a display module which are stacked together; the capacitive touch screen being used for sensing a touch signal; the display module comprising a display panel and a backlight module arranged relatively and a middle frame supporting the display panel and the backlight module; the display panel comprising an array substrate; the array substrate comprising a pixel electrode layer which is arranged to serve as a pixel electrode; wherein the pixel electrode layer also serves as a first capacitive sensing electrode; the middle frame having one side facing the backlight module and receiving a second capacitive sensing electrode arranged therein; a gap provided between the second capacitive sensing electrode and the backlight module; the first capacitive sensing electrode and the second capacitive sensing electrode configuring an electrode-induction device jointly, which is operable to sense a pressure signal applied on the capacitive touch screen;

wherein in a display time period of one frame, the pixel electrode layer is operated to alternately transmit pixel voltage signals and pressure sensing signals; and wherein the capacitive touch screen is stacked on a top side of the display module and the electrode-induction device that comprises the first and second capacitive sensing electrodes is arranged on an underside of the display module and is spaced from the capacitive touch screen.

2. The plug-in touch display device as recited in claim 1, wherein a material of the second capacitive sensing electrode is ITO (indium tin oxide).

3. The plug-in touch display device as recited in claim 1, wherein the capacitive touch screen comprises a touch sensing driving electrode and a touch induction electrode arranged on different layers; the touch sensing driving electrode and the touch induction electrode being used for sensing the touch signal applied on the capacitive touch screen.

4. The plug-in touch display device as recited in claim 1, wherein the capacitive touch screen is connected to a touch driver chip and the electrode-induction device is connected to a pressure sensor driver chip.

5. The plug-in touch display device as recited in claim 4, wherein the touch driver chip and the pressure sensor driver chip are integrated in the same control chip.

6. The plug-in touch display device as recited in claim 1, wherein the display panel further comprises a filter substrate; the filter substrate and the array substrate being arranged corresponding to each other; a liquid crystal layer being arranged between the array substrate and the filter substrate.

7. The plug-in touch display device as recited in claim 6, wherein the array substrate comprises a first glass substrate; the pixel electrode layer and a common electrode layer being arranged sequentially on one side of the liquid crystal layer near the first glass substrate; the pixel electrode layer and the common electrode layer being insulated from each other.

8. An electronic device comprises a housing and a touch display device installed in the housing; wherein the plug-in touch display device comprises a capacitive touch screen and a display module which are stacked together; the capacitive touch screen being used for sensing a touch signal; the display module comprising a display panel and a backlight module arranged relatively and a middle frame supporting the display panel and the backlight module; the display panel comprising an array substrate; the array substrate comprising a pixel electrode layer which is arranged to serve as a pixel electrode; wherein the pixel electrode layer also serves as a first capacitive sensing electrode; the middle frame having one side facing the backlight module and receiving a second capacitive sensing electrode arranged therein; a gap provided between the second capacitive sensing electrode and the backlight module; the first capacitive sensing electrode and the second capacitive sensing electrode configuring an electrode-induction device jointly, which is operable to sense a pressure signal applied on the capacitive touch screen;

wherein in a display time period of one frame, the pixel electrode layer is operated to alternately transmit pixel voltage signals and pressure sensing signals; and wherein the capacitive touch screen is stacked on a top side of the display module and the electrode-induction device that comprises the first and second capacitive sensing electrodes is arranged on an underside of the display module and is spaced from the capacitive touch screen.

9. The electronic device as recited in claim 8, wherein a material of the second capacitive sensing electrode is ITO (indium tin oxide).

10. The electronic device as recited in claim 8, wherein the capacitive touch screen comprises a touch sensing driving electrode and a touch induction electrode arranged on different layers; the touch sensing driving electrode and the touch induction electrode being used for sensing the touch signal applied on the capacitive touch screen.

11. The electronic device as recited in claim 8, wherein the capacitive touch screen is connected to a touch driver chip and the electrode-induction device is connected to a pressure sensor driver chip.

12. The electronic device as recited in claim 11, wherein the touch driver chip and the pressure sensor driver chip are integrated in the same control chip.

13. The electronic device as recited in claim 8, wherein the display panel further comprises a filter substrate; the filter substrate and the array substrate being arranged corresponding to each other; a liquid crystal layer being arranged between the array substrate and the filter substrate.

14. The electronic device as recited in claim 13, wherein the array substrate comprises a first glass substrate; the pixel electrode layer and a common electrode layer being arranged sequentially on one side of the liquid crystal layer near the first glass substrate; the pixel electrode layer and the common electrode layer being insulated from each other.

* * * * *